United States Patent

Buhl et al.

[11] Patent Number: 6,113,303
[45] Date of Patent: Sep. 5, 2000

[54] BALL PIN OF A UNIVERSAL JOINT FOR MOTOR VEHICLES

[75] Inventors: Reinhard Buhl, Bohmte; Wilfried Lustig, Hüde, both of Germany

[73] Assignee: ZF Lemforder Metallwaren AG, Stenmwede-Dielingen, Germany

[21] Appl. No.: 08/383,251

[22] Filed: Feb. 3, 1995

[30] Foreign Application Priority Data

Feb. 5, 1994 [DE] Germany .............................. 44 03 584

[51] Int. Cl.[7] .................................................. B25G 3/28
[52] U.S. Cl. ...................... 403/282; 403/122; 403/131; 403/279; 72/354
[58] Field of Search ................... 403/122, 131, 403/262, 263, 279, 282

[56] References Cited

U.S. PATENT DOCUMENTS

| | | | |
|---|---|---|---|
| 2,392,063 | 1/1946 | Reimann et al. | 403/131 X |
| 3,825,356 | 7/1974 | Crook, Jr. | 403/122 |
| 4,118,134 | 10/1978 | Mansel | 403/282 |
| 4,131,957 | 1/1979 | Bokros | 3/1.91 |
| 4,463,590 | 8/1984 | Theobald | 72/354 |
| 4,543,812 | 10/1985 | Theobald | 72/354 |
| 4,889,356 | 12/1989 | Morris | 403/131 X |
| 5,453,139 | 9/1995 | Gallagher, Jr. | 148/651 |
| 5,560,103 | 10/1996 | Harris et al. | 29/898.05 |

FOREIGN PATENT DOCUMENTS

| | | | |
|---|---|---|---|
| 535813 | 1/1957 | Canada | 403/131 |
| 1089717 | 3/1955 | France . | |
| 489037 | 11/1927 | Germany | 403/131 |
| 1708040 | 2/1955 | Germany . | |
| 928987 | 6/1957 | Germany | 403/131 |
| 1105292 | 4/1961 | Germany . | |
| 2210871 | 3/1972 | Germany | 403/131 |
| 1020671 | 2/1966 | United Kingdom . | |

*Primary Examiner*—Bruce A. Lev
*Attorney, Agent, or Firm*—McGlew and Tuttle, P.C.

[57] ABSTRACT

A metallic ball pin of a universal joint, preferably one with high load-bearing capacity, for motor vehicles, which is mounted movably in all directions in a bearing shell of a housing with a joint ball 2 designed at one end of a pin stump 1. To improve its functional properties and to reduce its manufacturing costs, a machined joint ball 2 with a through-hole 5 is nonrotatably attached to a fastening pin 4 of a pin stump 1 manufactured by cold forming in the direction of the longitudinal axis of the pin stump 1, and it is held by deforming the fastening pin 4.

13 Claims, 3 Drawing Sheets

BALL PIN OF A UNIVERSAL JOINT FOR MOTOR VEHICLES

FIELD OF THE INVENTION

The present invention pertains to a ball pin of a universal joint, preferably one with high load-bearing capacity, for motor vehicles which is mounted movably in all directions in a bearing shell of a housing with a joint ball provided at one end of a pin stump.

BACKGROUND OF THE INVENTION

A ball pin with these design features corresponds to the state of the art as put into practice in universal joints with high load-bearing capacity in chassis of motor vehicles. Such a ball pin has been manufactured in very large numbers by the corresponding manufacturers during the past decades. They are manufactured in one piece by machining an optionally preformed blank. Thus, different pin sizes require different blanks and correspondingly different machine control programs for machining in series production. The notch effect on the surface of the neck of the pin stump at its undercut transition into the joint ball, which is generated by the machining, causes a special problem, because the permanent load-bearing capacity is considerably reduced as a result. It is also difficult to meet high requirements in terms of corrosion protection, especially at the neck of the pin stump, at its transition into the joint ball. This corrosion protection is partially ensured by a very expensive process in the prior-art ball pins, of which millions of pieces are manufactured.

French Patent No. FR-PS 1,089,717 discloses a universal joint designed for a special application, in which the joint ball with an inner cone of a through-hole is axially pressed onto an outer cone of a fastening pin on a pin stump by a threaded screw. A very similar connection of a joint ball to a pin stump has also been known from British Patent No. GB-PS 1,020,671 for a joint of a relatively large size. Such ball pin designs are expensive and are equally poorly suitable for large lots for use in heavily loaded ball joints as for the transmission of stronger rotating forces between the joint ball and the pin stump.

The fastening of a joint ball made of plastic on a cylindrically designed ball pin made of steel for ball joints or the like carrying low loads has been known from German Auslegeschrift No. DE-AS 11,05,292. German Utility Patent No. DE-GM 17,08,040 discloses a mounting of spherical control pins, in which a spherical head part is prepared separately from a hard material, and it is attached to a pin made of a tough, elastic material with a blind hole.

SUMMARY AND OBJECTS OF THE INVENTION

It is an object of the present invention is to provide a ball pin design for ball joints with high load-bearing capacity in the chassis of a motor vehicle, which can be manufactured according to modern manufacturing methods at low cost for large lot sizes and which makes possible a high level of adaptation to different ball joint sizes.

According to the invention, a metallic ball pin is provided for use in a universal joint for motor vehicles. The ball pin is mounted for movement in all directions, within a bearing shell. The bearing shell is within a housing. The joint ball of the ball pin is designed provided at one end of a pin stump. The joint ball is machined with a through hole which is non-rotatably attached to a fastening pin of the pin stump. The pin stump is prepared by cold forming in a direction of a longitudinal axis of the pin stump. The pin stump is held by deformation of the fastening pin. The joint ball has a machined surface. The joint ball is non-rotatably attached to the pin stump and is fastened to the pin stump by cold forming a flanged edge at the end of the fastening pin. The through hole of the joint ball and the fastening pin of the pin stump have complimentarily engaging cross-sections and cylindrical jacket surfaces. The fastening pin and the through hole of the joint ball may be provided with support flanges acting in the axial direction of the pin stump and the flanged edge at the end of the fastening pin is in the form of a beaded edge connecting the joint ball to the fastening pin. The beaded edge may be located within the through hole of the joint ball.

Such a design of the ball pin makes it possible to combine uniformly designed joint balls and different pin stumps with one another in order to build up a modular system. This achieves the result that manufacturing costs can be considerably reduced. By connecting the joint ball to a pin stump manufactured by cold forming, notch effects on the surface of the ball pin are avoided. An extrusion process for cold forming is preferably used to manufacture the pin stump, so that surfaces of very high quality are formed, and the strength of the pin stump will be higher than in the case of prior-art pin stumps which are provided by machining. This leads to considerable functional improvements and to an increase in permanent load-bearing capacity. The strength-increasing properties of a extrusion process are utilized for preparing the pin stump. The deformation of the fastening pin for connecting the joint ball to the pin stump ensure a secure connection between these two parts even without conical fitting surfaces, which would require a special processing. The through-hole of the joint ball and the fastening pin of the pin stump thus having complementary, mutually engaging cross sections, but cylindrical jacket surfaces. Processing of the pin stump manufactured by cold forming is not necessary. Corrosion protection meeting high requirements can be achieved with simple means.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
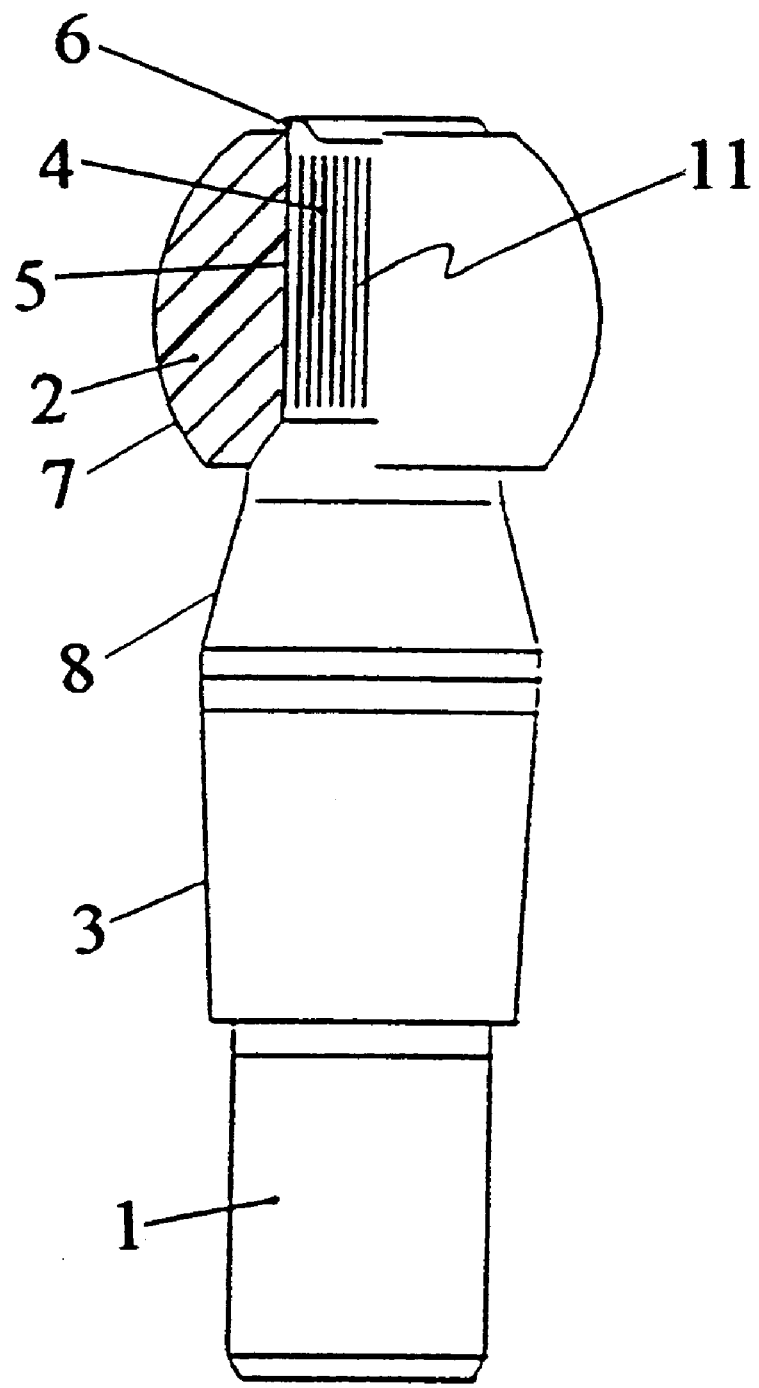
FIG. 1 is a side view of a ball pin with a section through the joint ball.

The ball pin according to the exemplary embodiment in FIG. 1 is comprised of a pin stump 1 and a joint ball 2, both of which are manufactured independently from one another and are then permanently connected to one another. The pin stump 1 can be inserted with an outer cone 3 into a corresponding inner cone of a motor vehicle part. The joint ball 2 is inserted with a bearing shell into the housing of a universal joint, which can be connected to another motor vehicle part.

At an axial end, the pin stump 1 has a fastening pin 4, to which the joint ball 2 with a cylindrical through-hole 5 is nonrotatably attached. A flanged edge 6, which is provided at the free end of the fastening pin 4 and is flanged to the outside after the joint ball 2 has been attached to the fastening pin 4, is used to connect the joint ball 2 to the fastening pin 4. The nonrotatable seating of the joint ball 2 on the fastening pin 4 is achieved by the fastening pin 4 and the through-hole 5 of the joint ball 2 having complementarily engaging cross-sectional profiles. For example, longitudinally extending wedges or ribs 11 are provided for this purpose. A slightly conical design of the fastening pin 4 and of the through-hole 5 for special applications shall not be ruled out, either.

A joint ball 2 of preferably constant dimensions, with corresponding processing and treated ball surface 7 is nonrotatably placed on the pin stump 1. The treatment of the surface 7 preferably is in the form of a machining. The pin stump is manufactured with accurate fit according to the cold extrusion process, in adaptation to special applications. Constant ball dimensions make it possible to considerably reduce the expense of machining and to improve the quality of the joint ball 2. Means for corrosion protection may be applied by simple means especially to the neck 8 of the pin stump 1 prior to the mounting of the joint ball 2, and this corrosion protection is improved compared with prior-art ball pins especially in the groove between the joint ball surface 7 and the neck 8 of the pin stump 1. Both the joint ball 2 and the pin stump 1 consist of a metallic material and are therefore particularly suitable for universal joints with high load-bearing capacity.

Figure 2:
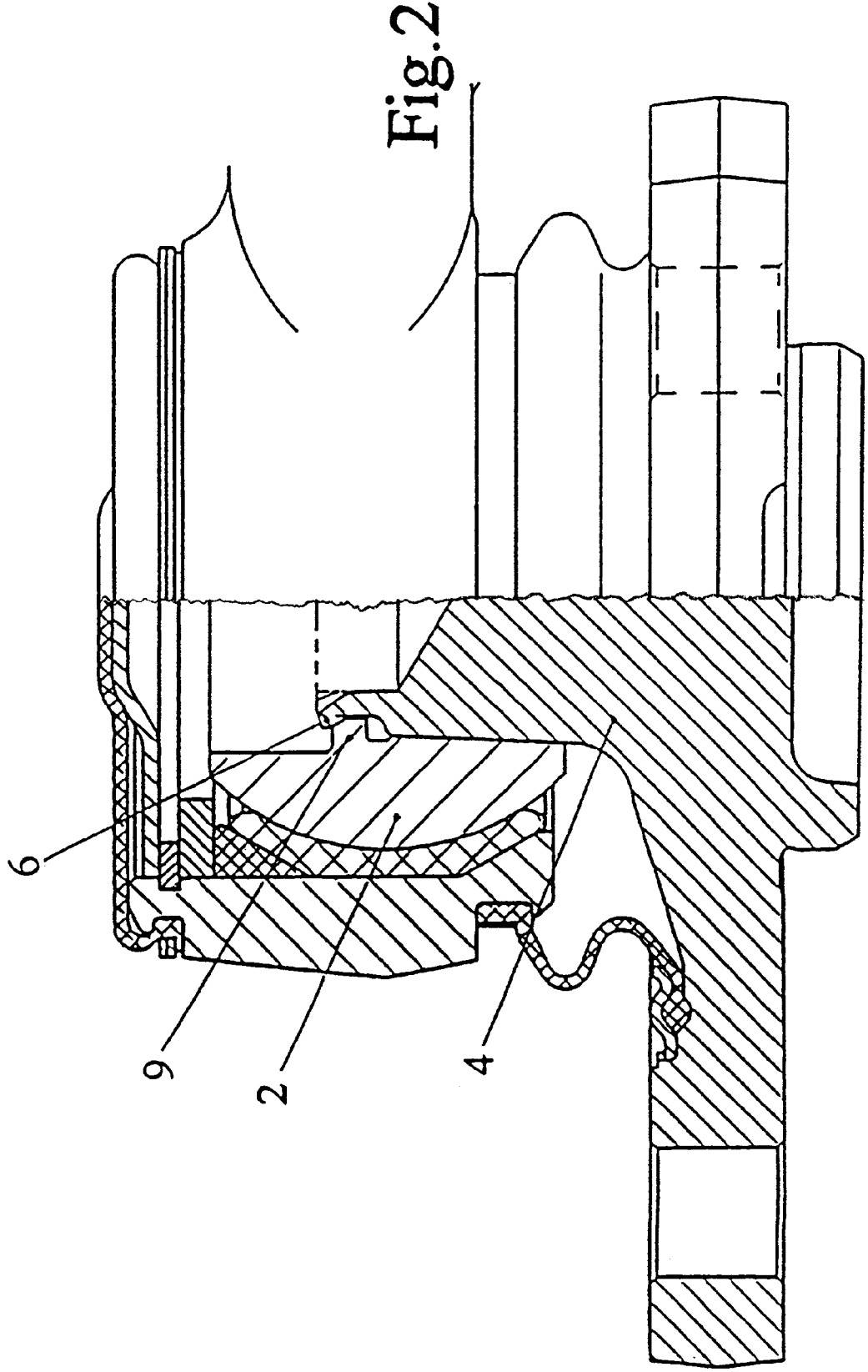
FIG. 2 is a joint assembly, shown half as a side view and half as a section.

In the exemplary embodiment according to FIG. 2, the flanged edge 6 of the fastening pin 4 is displaced into the inside of the joint ball 2 to reduce the overall height of the joint. Support flanges 9 spaced from ends of the through-hole 5 and acting in the axial direction of the pin stump, or designs with a comparable action, are provided on the inner jacket of the through-hole 5 of the joint ball 2 and on the outer jacket of the fastening pin 4.

Figure 3:
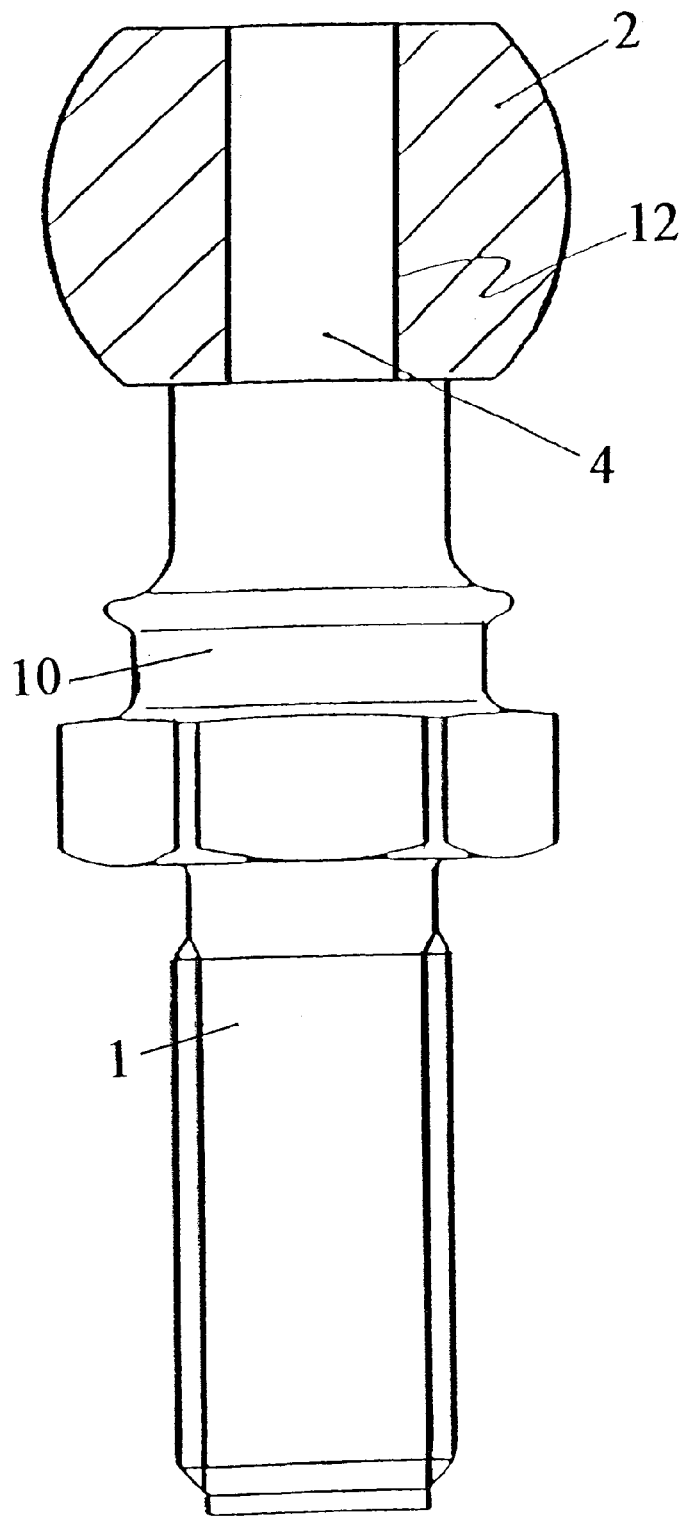
FIG. 3 is a side view of a ball pin with a design deviating from FIG. 1 with a bellows holding groove and a section through the joint ball.

FIG. 3 shows a design of the pin stump 1 and of the fastening pin 4, which are modified compared with the representation in FIG. 1, wherein the fastening pin 4 has, e.g., a noncircular cross-sectional profile 12 and is inserted into a complementary profile (rectangular square, triangular, rhombic, trapezoidal, polygonal, etc.) of the joint ball and fastened, e.g., shrunk in. The pin stump 1 also has a circular fastening groove 10 for one end of a sealing bellows arranged between the housing of a universal joint and the ball pin.

While specific embodiments of the invention have been shown and described in detail to illustrate the application of the principles of the invention, it will be understood that the invention may be embodied otherwise without departing from such principles.

APPENDIX

LIST OF REFERENCE NUMERALS:

| | |
|---|---|
| 1 | Pin stump |
| 2 | Joint ball |
| 3 | Outer cone |
| 4 | Fastening pin |
| 5 | Through-hole |
| 6 | Flanged edge |
| 7 | Ball surface |
| 8 | Pin neck |

APPENDIX-continued

LIST OF REFERENCE NUMERALS:

| | |
|---|---|
| 9 | Support flange |
| 10 | Fastening groove |
| 11 | Wedges or ribs |
| 12 | Non circular cross section |

What is claimed is:

1. Metallic ball pin of a universal joint for motor vehicles, comprising: a machined joint ball formed with a through hole, said machined joint ball has an outer surface, said machined joint ball is solid between said through hole and said outer surface; a pin stump formed with a fastening pin on an end thereof, said fastening pin being formed by cold forming in a direction of a longitudinal axis of said pin stump, said fastening pin being positioned within said through hole and said pin stump being non-rotatably joined to said machined joint ball by deformation of a portion of said fastening pin.

2. Metallic ball pin according to claim 1, wherein said machined joint ball has an outer machined surface, said pin stump being fastened to said machined joint ball by cold forming a flanged edge at an end of said fastening pin.

3. Metallic ball pin according to claim 2, wherein said through hole of said machined joint ball and said fastening pin of said pin stump have complimentary engaging cross sections and cylindrical jacket surfaces.

4. Metallic ball pin according to claim 1, wherein said through hole of said machined joint ball and said fastening pin of said pin stump have complimentary engaging cross sections and cylindrical jacket surfaces.

5. Metallic ball pin in accordance with claim 4, wherein:
said machined joint ball and said fastening pin have a plurality of ribs engaging each other.

6. Metallic ball pin in accordance with claim 1, wherein said fastening pin and a surface of said joint ball within said through hole have flanges acting in an axial direction of said pin stump, said deformation of said fastening pin resulting in a beaded edge connecting said joint ball to said fastening pin, said beaded edge being located within said through hole of said joint ball.

7. Metallic ball pin in accordance with claim 1, wherein:
a shape of said though hole and a shape of said fastening pin are substantially complimentary.

8. Metallic ball pin in accordance with claim 1, wherein:
said fastening pin has a noncircular cross-section;
said though hole has a noncircular cross-section substantially complimentary to said noncircular cross-section of said fastening pin.

9. Metallic ball pin in accordance with claim 8, wherein:
said noncircular cross-section of said fastening pin and said through hole extend over a substantially entire length of said fastening pin and said though hole.

10. Metallic ball pin in accordance with claim 1, wherein:
said machined joint ball has an outer machined surface, said pin stump being fastened to said machined joint ball by cold forming a flanged edge at an end of said fastening pin from said portion of said fastening pin;
said through hole of said machined joint ball and said fastening pin of said pin stump have complimentary engaging cross sections and cylindrical jacket surfaces;
a shape of said through hole and a shape of said fastening pin are substantially complimentary;
said fastening pin has a noncircular cross-section;

said through hole has a noncircular cross-section substantially complimentary to said noncircular cross-section of said fastening pin;

said noncircular cross-section of said fastening pin and said through hole extend over a substantially entire length of said fastening pin and said through hole.

11. Metallic ball pin in accordance with claim 1, wherein:

said joint ball includes a flange positioned inside said through hole and spaced from ends of said through hole;

said pin stump includes a flanged edge formable into a beaded edge on said flange of said joint ball, said beaded edge being positioned spaced from said ends of said through hole.

12. Metallic ball pin in accordance with claim 1, wherein:

said pin stump has a neck portion;

said pin stump includes corrosion protection means applied to said neck portion before said joint ball is joined to said pin stump.

13. Metallic ball pin of a universal joint for motor vehicles, the pin comprising:

a machined joint ball defining a through hole, said joint ball including a flange positioned inside said through hole and spaced from ends of said through hole;

a pin stump formed with a fastening pin on an end thereof, said fastening pin being formed by cold forming in a direction of a longitudinal axis of said pin stump, said fastening pin being positioned within said through hole, said pin stump including a flanged edge formable into a beaded edge on said flange of said joint ball, said pin stump being non-rotatably joined to said machined joint ball by deformation of a portion of said fastening pin, said beaded edge being positioned spaced from said ends of said through hole.

* * * * *